United States Patent Office 2,803,603
Patented Aug. 20, 1957

2,803,603

HEAT EXCHANGE COMPOSITIONS

Arthur D. Meighen, Terre Haute, Ind., assignor to Commercial Solvents Corporation, Terre Haute, Ind., a corporation of Maryland No Drawing. Application August 23, 1954,
Serial No. 451,671

6 Claims. (Cl. 252—75)

My invention relates to novel anticorrosion agents. More particularly, it relates to heat exchange media containing novel anticorrosion agents.

Both water alone and aqueous solutions of water-soluble alcohols are commonly employed as heat exchange media. One of the most extensive uses of these heat exchange media is in the cooling systems of internal combustion engines. Water alone is employed as a heat exchange medium in such cooling systems in tropical areas and during the warm months generally. Aqueous solutions of water-soluble alcohols are employed during the cold months of the year in order to afford protection against freezing for the cooling system. However, other applications are made of these heat exchange media than in internal combustion engine cooling systems such as stationary heat exchangers employed in industry. My invention is useful in all these applications for inhibiting corrosion of the metals in the heat exchange systems.

It has long been known that inclusion of small amounts of certain corrosion inhibiting substances in aqueous heat exchange media such as water and antifreeze compositions containing both water and water-soluble alcohols, substantially decreases the corrosion of the various metals making up the heat exchange system. In recent years it has been discovered that improved corrosion inhibition in such heat exchange media results from the use of several such substances as mixed corrosion inhibitors. However, the mixed corrosion inhibitors employed heretofore have certain disadvantages. For example, certain of the components often tend to lose their effectiveness before others of the mixture with the result that the mixture no longer serves as an anticorrosion agent. Of equal, if not greater importance is the fact that most systems with which heat exchange media come in contact contain several different metals as well as solder. Many agents which are effective as anticorrosion agents for a particular metal are actually corrosive to another metal of the system. This results in the necessity for including a second agent to neutralize the corrosive effect of the first. It may then be necessary to add still another agent to counteract some ill effect of this second agent. The correct selection of combinations of agents and the selective amounts thereof to give an effective anti-corrosion agent, therefore, requires a high degree of skill.

In addition, the stability of the inhibited antifreezes and their containers upon storage before distribution to the final consumer must be considered. Many antifreezes which are anticorrosive when diluted with water for use in heat exchange systems break down rapidly and attack metal containers upon storage before dilution. This break-down of the antifreeze composition is particularly prevalent in the case of ethylene glycol antifreezes. It may take the form of unpleasant odors or dark, insoluble precipitates formed by degradation products of the anticorrosion agents employed. The container attack upon storage may range from a relatively mild pitting to such pronounced corrosion as to cause leaks in the metal containers after storage for as short a period as one year or less. Therefore, the correct selection of anticorrosion agents must also result in a combination of agents which are stable upon storage for prolonged periods in the concentrated antifreeze composition.

I have now discovered novel anticorrosion compositions which render heat exchange media substantially non-corrosive toward the metals commonly used in heat exchange systems, which remain stable and effective for long periods of time, and which are stable upon protracted storage in antifreeze compositions. These new anticorrosion compositions comprise mixtures of a benzotriazole compound and a member selected from the group consisting of alkali metal metaborates, alkali metal tetraborates, calcium borate, and mixtures thereof.

The heat exchange compositions which employ my new synergistic anticorrosion composition herein described may contain as the major ingredient water, water and a water-soluble alcohol freezing point depressant, or the water-soluble alcohol depressant alone suitable for use in a heat exchange system when diluted with water to an alcohol content of from about 10% to about 60% by volume, as for example, in automotive cooling systems.

The water-soluble alcohols which can be inhibited by my new anticorrosion compositions include the lower monohydroxy alcohols and the lower aliphatic glycols commonly employed as freezing point depressants in antifreeze compositions such as methanol, ethanol, ethylene glycol, and propylene glycol.

The benzotriazole compounds useful in my compositions are benzotriazole, one of its alkali metal or ammonium salts or mixtures thereof. The borates used in my composition can be the sodium, potassium, other alkali metal or calcium salts of boric acid. I have found the metaborates and tetraborates of the above-named cations to be effective. The following boric acid salts are particularly suitable for use in my composition: Sodium metaborate, sodium tetraborate, potassium metaborate, potassium tetraborate, and calcium borate.

I have found that my new synergistic anticorrosion agents can consist of a percentage composition ranging from about 20% to about 99.6% by weight of a member selected from the group consisting of alkali metal metaborates, alkali metal tetraborates, calcium borate, and mixtures thereof, and from about 0.4% to about 80% of a benzotriazole compound. A composition possessing any percentage composition within these ranges is suitable for addition to any aqueous heat exchange media, including water or antifreeze mixtures used in an automotive cooling system for inhibiting the corrosive effects thereof.

However, in order to realize the desired inhibitory effect in a water-soluble alcohol antifreeze composition, I have found that my new anticorrosion agents must be added in amounts sufficient to produce concentrations of from about 0.01% to about 2.0% of the benzotriazole ingredient and from about 0.5% to about 3.0% of the borate ingredient based on the weight of the water-soluble alcohol. If the concentrations stated are present in an antifreeze composition then that composition when diluted for use to a water-soluble alcohol content of from about 10% to about 60% by volume will be substantially non-corrosive to the metals commonly used in automotive cooling systems and will remain substantially non-corrosive through prolonged use. Moreover, if present in the indicated amounts, the antifreeze composition containing my anticorrosion agents will be rendered stable upon prolonged storage in commercial containers, including metal cans.

Furthermore, I have found that my new anticorrosion agents can be added to water alone or antifreeze compositions of water and water-soluble alcohols already adjusted to the dilution for use if my agents are added in amounts sufficient to produce concentrations of from about 0.002% to about 0.4% of the benzotriazole ingredient and from about 0.1% to about 0.6% of the borate ingredient. The water or diluted antifreeze composition is thereby rendered substantially non-corrosive for prolonged periods of use. Thus, my new anticorrosion agents can be used to inhibit corrosion by water and by already diluted antifreeze compositions and to reinhibit antifreeze compositions in which the corrosion inhibitors have become exhausted.

For purposes of inclusion in water and diluted antifreeze compositions, my new anticorrosion agents can conveniently be packaged as concentrated aqueous solutions for ready addition to such heat exchange media. When my new mixed corrosion inhibitors are intended for use in automotive cooling systems containing water alone as a coolant, it is sometimes desirable to include in the aqueous concentrate of anticorrosion agent a so-called "soluble oil" for purposes of lubrication. Such "soluble oils" generally are medium viscosity mineral oils containing added emulsifiers to render them easily emulsifiable in water. Irrespective of whether such a "soluble oil" has any observable anticorrosive effect as an emulsion in water, the use of my new anticorrosion agents therewith greatly enhances the total anticorrosive effect.

The following table sets forth a comparison of my new anticorrosion agent with various amounts of the individual synergistic corrosion inhibiting compounds when each is included in a typical antifreeze composition. Table I reports the results of static corrosion tests of two weeks' duration using test discs of all metals commonly used in heat exchange systems. The brass, copper, solder, and steel discs had a surface area of 17.0 square cms., while the aluminum and cast iron discs had an area of 22.8 square cms. The amounts of each corrosion inhibiting ingredient are stated as the concentration in ethylene glycol which was diluted with water to an ethylene glycol concentration of 20% by volume for testing. From these data it is seen that the mixed corrosion inhibitor of the first formula is composed of 90.9% sodium tetraborate and 9.1% benzotriazole included in the glycol at a concentration of 2.2% by weight and in the diluted antifreeze at a concentration of 0.44% by weight. In the figures given in the table, a "+" indicates that an increase in the weight of the disc was observed. The weights not thus marked represent the loss of metal in mgs. from the test discs.

Table I

| Formula | Glycol Conc., Percent | Weight Loss, mgs. | | | | | |
|---|---|---|---|---|---|---|---|
| | | Alum. | Brass | Copper | Solder | Steel | Cast Iron |
| 0.2% Benzotriazole / 2.0% Sodium tetraborate | 20 | 0.1 | 0.2 | 0.5 | 0.8 | +0.3 | 5.2 |
| 2.0% Sodium tetraborate | 20 | 40.4 | 0.9 | 1.2 | 2.8 | 5.4 | 167.3 |
| 0.2% Sodium Benzotriazole | 20 | 22.8 | 1.7 | 0.6 | 12.0 | 1.2 | 236.5 |
| 1.0% Benzotriazole | 20 | 6.3 | +0.4 | 0.0 | 19.1 | 59.6 | 101.5 |
| 2.0% Benzotriazole | 20 | 69.2 | 2.0 | 2.6 | 3.2 | 5.2 | 274.6 |

In Table II are set forth results of additional two-week static corrosion tests on the same size and type metal discs as in Table I above which demonstrate the equivalence of other borates to the sodium tetraborate ingredient of my new anticorrosion agents. Among the other borates shown are sodium metaborate and calcium borate. The amounts of each ingredient are stated as the concentration in ethylene glycol which is then diluted for testing.

Table II

| Formula | Glycol Conc., Percent | Weight Loss, mgs. | | | | | |
|---|---|---|---|---|---|---|---|
| | | Alum. | Brass | Copper | Solder | Steel | Cast Iron |
| 0.2% Benzotriazole / 2.0% Sodium tetraborate | 20 | 0.1 | 0.2 | 0.5 | 0.8 | +0.3 | 5.2 |
| 0.2% Sodium benzotriazole / 2.0% Sodium metaborate | 20 | 16.0 | 1.4 | 2.0 | 15.9 | 1.8 | 4.6 |
| 0.1% Benzotriazole / 2.0% Calcium borate | 20 | +7.2 | 10.4 | 2.6 | 6.5 | 0.7 | 0.6 |

In Table III are set forth results of additional two-week static corrosion tests on the same size and type metal discs which demonstrate the ranges of percentage composition of my new anticorrosion agents which are effective in the prevention of corrosion in heat exchange systems. The amounts of each ingredient are stated as the concentration in ethylene glycol which is then diluted to a concentration of 20% by volume for testing.

Table III

| Conc. of Inhibitors in Glycol | | Weight Loss, mgs. | | | | | |
|---|---|---|---|---|---|---|---|
| Sodium tetraborate, percent | Benzotriazole, percent | Alum. | Brass | Copper | Solder | Steel | Cast Iron |
| 3.0 | 1.0 | +0.3 | +0.2 | 0.8 | 0.2 | +0.4 | 0.9 |
| 3.0 | 0.2 | 0.1 | 0.4 | 0.6 | 0.4 | +0.4 | 0.2 |
| 3.0 | 0.1 | +4.6 | 0.4 | 0.9 | 0.3 | 0.2 | 0.7 |
| 2.5 | 1.0 | +2.5 | 0.5 | 2.1 | 0.6 | +0.1 | 0.6 |
| 2.5 | 0.2 | 3.0 | +0.1 | 0.5 | 0.4 | 0.8 | +0.4 |
| 2.0 | 1.0 | 0.9 | 0.6 | 2.4 | 0.7 | +0.1 | 0.6 |
| 2.0 | 0.2 | 0.1 | 0.2 | 0.5 | 0.8 | +0.3 | 5.2 |
| 2.0 | 0.1 | +5.6 | +0.1 | 1.1 | 0.3 | 1.5 | 13.4 |
| 2.0 | 0.05 | 1.3 | 0.0 | 0.4 | +0.1 | 0.0 | 1.1 |
| 2.0 | 0.025 | 15.3 | 1.1 | 0.6 | +0.5 | 0.1 | +1.3 |
| 2.0 | 0.012 | +0.8 | 0.2 | 0.5 | 0.3 | +0.2 | 5.7 |
| 1.5 | 1.0 | +1.1 | 0.7 | 2.3 | 0.5 | +0.7 | 0.7 |
| 1.5 | 0.3 | 5.3 | 0.5 | 0.5 | 0.5 | +0.6 | 1.9 |
| 1.5 | 0.2 | 1.1 | +0.4 | 0.4 | 1.6 | +0.6 | 8.5 |
| 1.5 | 0.05 | +8.6 | 0.5 | 0.7 | +0.3 | 2.4 | 0.6 |
| 1.5 | 0.025 | 2.0 | +0.7 | 1.1 | +0.2 | 0.0 | 2.1 |
| 1.5 | 0.012 | +3.8 | 0.0 | 0.8 | +0.1 | 0.1 | 4.1 |
| 1.0 | 1.0 | 24.2 | 1.9 | 1.5 | 2.0 | +0.5 | 1.3 |
| 1.0 | 0.3 | 2.3 | 0.4 | 0.7 | 0.9 | 0.2 | 23.4 |
| 1.0 | 0.1 | +0.6 | +0.1 | 1.1 | 0.0 | 3.5 | 27.4 |
| 0.5 | 1.0 | 22.9 | 1.4 | 1.4 | 1.2 | 0.3 | 78.6 |
| 0.5 | 0.3 | 7.4 | 0.5 | 0.6 | 0.7 | 0.2 | 133.7 |
| 0.5 | 0.1 | 8.8 | 1.0 | 0.5 | 0.6 | 0.9 | 194.3 |
| [1] 2.0 | 2.0 | 2.1 | 0.9 | 1.8 | 1.5 | 0.3 | 1.0 |

[1] Sodium metaborate.

In Table III it is demonstrated that my new anticorrosion compositions effectively inhibit corrosion when the respective ingredients thereof are present in amounts of from 0.5% to 3% alkali metal borate and from about 0.01% to about 2.0% benzotriazole in ethylene glycol when the resulting inhibited antifreeze is diluted to an ethylene glycol concentration of 20% by volume. These concentrations are equivalent to concentrations of from 0.1% to 0.6% alkali metal borate and from about 0.002% to about 0.4% benzotriazole based on the weight of the total diluted heat exchange medium employed.

The effectiveness of my new anticorrosion agents in water alone is demonstrated in Table IV which sets forth the results of additional two-week static corrosion tests on the same size and type metal discs. The amounts of each ingredient are stated as the concentration in tap water. Each test was performed in duplicate.

*Table IV*

| Formula | Weight loss, mgs. | | | | | |
|---|---|---|---|---|---|---|
|  | Alum. | Brass | Copper | Solder | Steel | Cast Iron |
| 0.04% Benzotriazole. 0.4% Sodium tetraborate | 3.2 | +0.1 | +0.3 | 0.2 | +3.5 | 1.0 |
|  | 10.9 | +0.5 | +0.1 | 1.0 | +1.3 | +1.7 |
| 0.1% Benzotriazole. 0.3% Sodium tetraborate | 2.3 | 0.1 | +0.2 | 1.5 | +1.4 | 2.3 |
|  | 2.5 | 0.0 | 0.1 | 1.4 | +1.3 | 1.3 |

I do not intend to be limited to the specific amounts, procedures, and materials disclosed in the above tables. The scope of my invention is as set forth in this specification and the appended claims.

Now having described my invention, what I claim is:

1. An antifreeze composition comprising a water-soluble alcohol as the chief non-aqueous ingredient and an anticorrosion agent containing as the essential anticorrosive components from about 0.4% to about 80% of a compound selected from the group consisting of benzotriazole, alkali metal salts of benzotriazole, ammonium salt of benzotriazole, and mixtures thereof and from about 99.6% to about 20% of a member selected from the group consisting of alkali metal metaborates, alkali metal tetraborates, calcium borate, and mixtures thereof, which anticorrosion agent is present in the antifreeze composition in an amount sufficient to produce concentrations of from about 0.01% to about 2.0% of the benzotriazole compound and from about 0.5% to about 3.0% of the member selected from the group consisting of alkali metal metaborates, alkali metal tetraborates, calcium borate, and mixtures thereof based on the weight of the water-soluble alcohol.

2. An antifreeze composition comprising a water-soluble alcohol as the chief non-aqueous ingredient and an anticorrosion agent containing as the essential anticorrosive components from about 0.4% to about 80% benzotriazole and from about 99.6% to about 20% sodium tetraborate, which anticorrosion agent is present in the antifreeze composition in an amount sufficient to produce concentrations of from about 0.01% to about 2.0% of benzotriazole and from about 0.5% to about 3.0% of sodium tetraborate based on the weight of the water-soluble alcohol.

3. An antifreeze composition comprising a water-soluble alcohol as the chief non-aqueous ingredient and an anticorrosion agent containing as the essential anticorrosive components from about 0.5% to about 80% benzotriazole and from about 99.6% to about 20% sodium metaborate, which anticorrosion agent is present in the antifreeze composition in an amount sufficient to produce concentrations of from about 0.01% to about 2.0% of benzotriazole and from about 0.5% to about 3.0% of sodium metaborate based on the weight of the water-soluble alcohol.

4. An antifreeze composition comprising a water-soluble alcohol as the chief non-aqueous ingredient and an anticorrosion agent containing as the essential anticorrosive components from about 0.4% to about 80% benzotriazole and from about 99.6% to about 20% calcium borate, which anticorrosion agent is present in the antifreeze composition in an amount sufficient to produce concentrations of from about 0.01% to about 2.0% benzotriazole and from about 0.5% to about 3.0% of calcium borate based on the weight of the water-soluble alcohol.

5. An antifreeze composition comprising a water-soluble alcohol as the chief non-aqueous ingredient and an anticorrosion agent containing as the essential anticorrosive components from about 0.4% to about 80% sodium benzotriazole and from about 99.6% to about 20% sodium tetraborate, which anticorrosion agent is present in the antifreeze composition in an amount sufficient to produce concentrations of from about 0.01% to about 2.0% of sodium benzotriazole and from about 0.5% to about 3.0% of sodium tetraborate based on the weight of the water-soluble alcohol.

6. An antifreeze composition comprising a water-soluble alcohol as the chief non-aqueous ingredient and an anticorrosion agent containing as the essential anticorrosive components from about 0.4% to about 80% sodium benzotriazole and from about 99.6% to about 20% sodium metaborate, which anticorrosion agent is present in the antifreeze composition in an amount sufficient to produce concentrations of from about 0.01% to about 2.0% of sodium benzotriazole and from about 0.5% to about 3.0% of sodium metaborate based on the weight of the water-soluble alcohol.

References Cited in the file of this patent

UNITED STATES PATENTS

| 2,373,570 | Keller | Apr. 10, 1945 |
| 2,618,608 | Schaeffer | Nov. 18, 1952 |

OTHER REFERENCES

Hackh's "Chemical Dictionary," third ed. (1944), page 118.